(12) United States Patent
Ringger et al.

(10) Patent No.: US 7,346,493 B2
(45) Date of Patent: Mar. 18, 2008

(54) LINGUISTICALLY INFORMED STATISTICAL MODELS OF CONSTITUENT STRUCTURE FOR ORDERING IN SENTENCE REALIZATION FOR A NATURAL LANGUAGE GENERATION SYSTEM

(75) Inventors: Eric Ringger, Issaquah, WA (US); Michael Gamon, Seattle, WA (US); Martine Smets, Redmond, WA (US); Simon Corston-Oliver, Seattle, WA (US); Robert C. Moore, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 847 days.

(21) Appl. No.: 10/396,549

(22) Filed: Mar. 25, 2003

(65) Prior Publication Data

US 2004/0193401 A1    Sep. 30, 2004

(51) Int. Cl.
*G06F 17/21* (2006.01)
*G06F 17/27* (2006.01)

(52) U.S. Cl. .......................... 704/9; 704/10
(58) Field of Classification Search ............... 704/9
See application file for complete search history.

(56) References Cited

U.S. PATENT DOCUMENTS 4,887,212 A * 12/1989 Zamora et al. ............... 704/8
5,101,349 A * 3/1992 Tokuume et al. ............. 704/9
5,146,406 A * 9/1992 Jensen ........................... 704/9
5,930,746 A * 7/1999 Ting ............................... 704/9
6,374,220 B1 * 4/2002 Kao ............................ 704/255
2003/0182102 A1   9/2003 Corston-Oliver

FOREIGN PATENT DOCUMENTS

| EP | 1 280 069 | | 1/2003 |
| JP | 03225389 A | * | 10/1991 |
| JP | 04024767 A | * | 1/1992 |
| WO | WO 01/37126 A2 | | 5/2001 |

OTHER PUBLICATIONS

Johnson, Mark "Joint and Conditional Estimation of Tagging and Parsing Models", Proceedings of he 39th Annual Meeting on Association for Computational Lingustics; Toulouse, France; Jul. 6-11, 2001, pp. 322-329.*
Wilcock et al., G "Head-Driven Generation with HPSG", Proceedings of the 17th international conference on Computational linguistics—vol. 2; Montreal, Quebec, Canada; Aug. 10-14, 1998, pp. 1392-1397.*

(Continued)

*Primary Examiner*—Richemond Dorvil
*Assistant Examiner*—Justin W. Rider
(74) *Attorney, Agent, or Firm*—John D. Veldhuis-Kroeze; Westman, Champlin & Kelly, P.A.

(57) ABSTRACT

The present invention is a tree ordering component within a sentence realization system which receives an unordered syntax tree and generates a ranked list of alternative ordered syntax trees from the unordered syntax tree. The present invention also includes statistical models of constituent structure employed by the tree ordering component in scoring the alternative ordered trees.

26 Claims, 7 Drawing Sheets

OTHER PUBLICATIONS

Charniak, E. "STATISTICAL Techniques for Natural Language Parsing", AI Magazine vol. 18, No. 4, Winter 1997, pp. 33-44.

Charniak, E. "A Maximum-Entropy-Inspired Parser", Proceedings of the 1st meeting of the North American Chapter of the Association for Computational Linguistics, 2000, pp. 132-139.

Charniak, E. "Immediate-Head Parsing for Language Models", Proceedings of the 39th Annual Meeting of the Association for Computational Linguistics, Jul. 9, 2001, pp. 116-123.

Chickering, D. "The WinMine Toolkit", Microsoft Technical Report MSR-TR-2002-103, Oct. 23, 2002.

Corston-Oliver et al, S. "An overview of Amalgam: A machine-learned generation module", Proceedings of the International Natural Language Generation Conference, New York, Jul. 2002, pp. 33-40.

Gamon et al., Michael "Amalgam: A machine-learned generation module", Microsoft Technical Report MSR-TR-2002-57, Jun. 11, 2002.

Gamon et al., Michael "Machine-learned contexts for linguistics operations in German sentence realization", Proceedings of the 40th Annual Meeting of the Association for Computational Linguistics (ACL), Philadelphia, Jul. 2002, pp. 25-32.

Heeman, Peter A. "POS Tags and Decision Trees for Language Modeling", Joint SIGDAT Conference on Empierial Methods in Natural Language Processing and Very Large Corpora, College Park, Maryland, Jun. 1999.

Langkilde, I. "Forest-Based Statistical Sentence Generation", Association for Computational Linguistics 1st Meeting of the North American Chapter of the Association for Computational Linguistics, Apr. 29, 2000, pp. 170-177.

Langkilde-Geary, I. "An Empirical Verification of Coverage and Correctness for a General-Purpose Sentence Generator", Second International Natural Language Generation Conference, Harriman, New York, Jul. 2002, pp. 17-24.

Langkilde et al., I. "The Practical Value of N-Grams in Generation", Proceedings in 9th International Workshop on Natural Language Generation, Niagara-on-the-Lake, Ontario, 1998, pp. 248-255.

Magerman, D. "Statistical Decision-Tree Models for Parsing", Proceedings of ACL 1995, Cambridge, Massachusetts, pp. 276-283.

Search Report for EP Application No. 03006251.7 dated Dec. 13, 2005.

Aikawa et al., "Generation for Multilingual MT", European Association for Machine Translation Summit VIII, Spain, pp. 1-5, Sep. 2001.

Lavoie et al., "A Fast and Portable Realizer for Text Generation Systems", in proceedings of the Fifth Conference on Applied Natural Language Processing (ANLP97), pp. 265-268, 1997.

Iordanskaja et al., "Generation of Extended Bilingual Statistical Reports", proceedings of International Committee on Computational Linguistics and the Association for Computational Linguistics, pp. 1019-1023, Aug. 1992.

Becker et al., "An Efficient Kernel for Multilingual Generation in Speech-to-Speech Dialogue Translation", proceedings of the 17th International Conference on Computational linguistics, vol. 1, pp. 110-116, Aug. 1998.

Beeferman et al., "CYPERPUNC: A Lightweight Punctuation Annotation System for Speech", proceedings of the 17th International Conference on Acoustics, Speech, and Signal Processing, vol. 2, pp. 689-692, May 1998.

* cited by examiner

| Model | German | French |
|---|---|---|
| LM joint, head-driven | 5.78% | 3.52% |
| DT joint, head-driven | 6.42% | 3.93% |
| DT joint with $f(\alpha_i)$ head-driven | 6.29% | 3.98% |
| DT joint, L-to-R | 5.95% | 3.83% |
| DT joint with $f(\alpha_i)$ L-to-R | 5.85% | 4.01% |
| DT conditional, head-driven | 6.47% | 4.22% |
| DT conditional, L-to-R | 6.05% | 4.27% |
| DT binary conditional, greedy search | 4.00% | 1.96% |
| DT normalized binary conditional, exhaustive search | 4.11% | 2.00% |

FIG. 10

| Model | Without | With |
|---|---|---|
| DT conditional, head-driven | 6.47% | 5.86% |
| DT conditional, L-to-R | 6.05% | 5.41% |
| DT binary conditional, greedy search | 4.00% | 3.48% |
| DT normalized binary conditional, exhaustive | 4.11% | 3.56% |

FIG. 11

LINGUISTICALLY INFORMED STATISTICAL MODELS OF CONSTITUENT STRUCTURE FOR ORDERING IN SENTENCE REALIZATION FOR A NATURAL LANGUAGE GENERATION SYSTEM

BACKGROUND OF THE INVENTION

The present invention deals with natural language generation. More specifically, the present invention deals with sentence realization in a natural language generation system.

A natural language generation system generates a text from a linguistic representation of a sentence. Such systems typically include a text planner or content selection component, a sentence planner component and a sentence realization component.

The text planner or content selection component obtains, as an input, content that is to form the basis of the realized text. The sentence-planning portion determines how to organize the content into sentences, and the sentence realization component determines how to formulate the actual output sentence.

For example, assume that the text planner provides content words such as "Little Red Riding Hood", "walking", and "grandmother's house". The sentence planner determines that "Little Red Riding Hood" is the agent, the action is "walking", and the destination is "grandmother's house". The sentence planner provides this abstract linguistic representation as an input to the sentence realization component. The sentence realization component performs the complex task of mapping from the abstract linguistic representation to an actual sequence of words and punctuation corresponding to that abstract linguistic representation. The actual sequence of words and punctuation is the realized sentence (also referred to as the surface string) which is output by the system.

Prior sentence realization systems have tended to fall into two different categories. The first type of system is a hand-coded, rule-based system that successively manipulates the linguistic representation to produce representations from which the surface string can simply be read. In such systems, computational linguists typically explicitly code strategies for stages ranging from planning texts and aggregating content into a single sentence, to choosing appropriate forms of referring expressions, performing morphological inflection and formatting an output. Such systems have typically included a large volume of handwritten code which is extremely time consuming to produce. In addition, such hand-coded systems encounter great difficulty in adapting to new domains, and even more difficulty adapting to different languages.

The second type of sentence realization system, typically used in the past, attempts to generate candidate sentences directly from the input linguistic representation. For example, such systems have been used in highly domain-specific applications (such as in flight reservations) in which there are a finite number of templates, and the content words are simply assigned to the various slots in the templates. The filled-in templates are used to directly generate an output.

Another type of sentence realization system enumerates all possible candidate sentences that can be generated from the abstract linguistic representation of the sentence. In these cases, the candidate sentences are evaluated using statistical techniques that prefer the sentences in which combinations of words most closely match combinations observed in real text. However, for a given linguistic representation, the number of candidate sentences to be examined can be extremely large. This leads to slow computation times. Furthermore, the techniques used to evaluate the candidate sentences often perform poorly on long distance linguistic phenomena. This makes such systems ill-suited to genres and languages in which long distance phenomena are common.

An example of a system in this third category is the Nitrogen system, as described in Langkilde, I. and K. Knight, 1998, "The Practical Value of N-Grams in Generation," *Proceedings of the 9th International Workshop on Natural Language Generation*, Niagara-on-the-Lake, Canada, pages 248-255; and Langkilde, I. and K. Knight, 1998, "Generation that Exploits Corpus-Based Statistical Knowledge," *Proceedings of the 36th Annual Meeting of the Association for Computational Linguistics and 17th International Conference on Computational Linguistics (COLING-ACL 1998)*, Montreal, Quebec, Canada, pages 704-710.

In the first of these systems, word bi-grams are used instead of deep linguistic knowledge to decide among alternative output sentences. Two sets of knowledge-engineered rules operate on the input specification to produce candidate output sentences. One set of rules performs one-to-many mappings from under-specified semantics to possible syntactic formulations, fleshing out information such as definiteness and number that might be missing in practical generation contexts such as Japanese-to-English machine translation systems. The second set of rules, which include sensitivity to the target domain, transforms the representations produced by the first module to yield still more candidate sentences that are represented as a word lattice. Morphological inflection, performed by simple table look-up, further expands the lattice. Word bi-grams are used to find the optimal traversal of the lattice, yielding the best-ranked output sentence. This system generates a very large number of candidate sentences to be scored and ranked. For example, in one of the examples given in Langkilde, I. and K. Knight, the input semantic form includes five lexical nodes in such relationships as AGENT, DESTINATION, and PATIENT. The word lattice that results from this semantic input contains more than 11 million possible paths, with the top-ranked candidate being "Visitors who came in Japan admire Mount Fuji." Another such example (for which the semantic input representation is not given) appears to contain only two content words that are transformed into a lattice containing more than 155,000 paths to yield the top-ranked candidate "I can not betray their trust."

The word bi-gram language model used in this system suffers from its inability to capture dependencies among non-contiguous words. Increasing the order of the language model to tri-grams or to higher order n-grams is possible, but the models still fail to capture typical long distance dependencies. Furthermore, data sparseness is an issue as the order increases.

We also note other prior work relevant to the parts of the present disclosure referred to below as the order model. One relevant area includes "generative" parsing models. Such models are employed in the parsing (i.e., syntactic analysis) process to assign probabilities to alternative syntax trees. The name "generative" indicates that the model can also be sampled randomly to generate a sentence structure according to the distributions in the model. As in the parsing process, such a model can assign a probability to possible constituent structures, given relevant features during the generation process.

Examples of such parsing models are set out in the following publications. Eugene Charniak, "A Maximum-Entropy-Inspired Parser", appearing in *The Proceedings of*

NAACL-2000, Seattle, Wash., pp. 132-139. Also: Eugene Charniak, "Immediate-Head Parsing for Language Models", appearing in *the Proceedings of the 39th Annual Meeting of the Association for Computational Linguistics* (2001), Toulouse, France, pp. 116-123. In the work described in these papers, assessments of constituent probability are conditioned on contextual information such as the head of the constituent. One aspect of the order models in the present invention that sets the work disclosed here apart from Charniak's models and from prior generative parsing models is the use of semantic relations and other features available to the generation task but not during parsing.

Another point of reference is the parsing work of David Magerman, which employed decision trees to estimate distributions of interest for parsing. See Magerman M. 1995, "Statistical Decision-Tree Models for Parsing," in *Proc. of ACL*, pp. 276-283. The primary distinctions between that work and this invention are the use in parsing versus generation and the difference in features available to each model. Furthermore, Magerman's models were not generative.

Word and constituent order play a crucial role in establishing the fluency and intelligibility of a sentence. Establishing order in the sentence realization stage of natural language generation has generally been accomplished by handcrafted generation grammars in the past. See for example, Aikawa T. et al., 2001, "Multilingual sentence generation," in *Proceedings of the 8th European Workshop on Natural Language Generation*, Toulouse, France pp. 57-63; and Reiter E. et al., 2000, "Building natural language generation systems," Cambridge University Press. Recently, statistical approaches have been explored. The Nitrogen system described above and the Fergus system (see Bangalore S. and Rambow O., 2000, "Exploiting a probabilistic hierarchical model for generation," in *Proceedings of COLING* 2000, Saarbrücken, Germany, pp 42-48) have employed word n-gram language models to choose among a large set of word sequence candidates which vary in constituent order, word order, lexical selection, and morphological inflection. In the Nitrogen and Fergus systems, constituent order is only modeled indirectly through word n-grams on the surface strings; i.e., order is not isolated as a separate phenomenon from the selection of appropriate morphological variants and the resolution of underspecified inputs. Also, they do not leverage significant linguistic features available during realization.

The Halogen system (see Langkilde I., 2000, _"Forest-Based Statistical Sentence generation," in *Proceedings of NAACL* 2000, pp. 170-177; and Langkilde-Geary I., 2002, "An Empirical Verification of Coverage and Correctness for a General-Purpose Sentence Generator," in *Proceedings of the International Language Generation Conference* 2002, New York, pp.17-24.)—like Nitrogen—uses a word n-gram model, but it extracts the best-scoring surface realizations efficiently from a forest (rather than a lattice) by constraining the search first within the scope of each constituent.

The Amalgam system (see Corston-Oliver et al., 2002, "An overview of Amalgam: a machine-learned generation module," in *Proceedings of the International Language Generation Conference* 2002, New York, pp.33-40) has an explicit ordering stage that determines the order of constituents and their daughters rather than words directly. Amalgam leverages tree constituent structure and features of those constituents. By establishing order within constituents, Amalgam constrains the possible sentence realizations at the word level. However, improvements in the Amalgam models of constituent structure used to establish constituent order in natural language generation can yield improved results; these enhancements are the focus of the present disclosure.

SUMMARY OF THE INVENTION

The present invention is a component that orders constituents in a syntax tree structure so that correct word order is established in sentence realization. The product is an ordered syntax tree or a scored and ranked list of alternative ordered syntax trees. This tree ordering component (or group of components) of the system receives an unordered syntax tree and evaluates the probability of alternative orderings of that syntax tree, based on statistical models of constituent structure (including decision tree models). Using decision tree models to estimate the probability distributions in models of constituent structure is also a contribution of this invention. This technique allows a large feature space with automatic feature selection.

In other embodiments, techniques other than decision tree learning, such as maximum entropy training and language modeling, can be employed to estimate the parameters of the model of constituent structure (herein referred to also as the "order model".)

In some embodiments, the tree ordering component employs a conditional constituent order model which, given the unordered syntax tree, identifies which of a plurality of alternative ordered syntax trees has a highest conditional probability given the unordered syntax tree. In some more particular embodiments, the conditional constituent order model is a binary conditional constituent order model.

In some embodiments for which the order model is a conditional constituent order model, the model is a Markov grammar. In some more particular embodiments, the Markov grammar is a left-to-right Markov grammar, or a head-driven Markov grammar. This definition is not limited to the above orientations and can include other orientations, such as right-to-left, or alternating left and right, etc.

In some embodiments, the tree ordering component employs a joint constituent order model, which assigns a score to each of a plurality of alternative ordered syntax trees together with the given unordered syntax tree. These joint models are Markov grammars. Again, for the joint models, there are more particular embodiments with orientations left-to-right, head-driven, etc.

In some embodiments, the order model estimates the probability of a constituent's order by conditioning on features of the constituent's daughters. For example, the model can condition on the semantic relation between the head daughter and the daughter in question. In another embodiment, a contextual feature is the number of daughters of the constituent already ordered, or the number of daughters of the constituent remaining to be ordered. In yet another embodiment, a feature is a number of daughters of the constituent already ordered (or remaining to be ordered) having a particular constituent label.

In some embodiments, the order model conditions probabilities of the ordered syntax trees on at least one lexical feature. Possible lexical features include, for example, transitivity and compatibility with clausal complements.

In other embodiments, the order model conditions probabilities of the ordered syntax trees on at least one semantic feature, such as semantic relation or the presence of quantification operators. Still other features can be used in other embodiments.

BRIEF DESCRIPTION OF THE DRAWINGS

FIG. 10 is a table of results comparing various order models for both German and French.

FIG. 11 is a table of results comparing a subset of the order models, with and without verb position features.

DETAILED DESCRIPTION OF ILLUSTRATIVE EMBODIMENTS

The present invention is described with respect to a sentence realization system. The present invention includes the tree ordering component of the overall sentence realization system and methods involved in that component The present invention utilizes decision trees to estimate the probability distributions in models of constituent structure to establish constituent order in natural language generation. This approach can handle a large feature space without manual feature selection. The technique is described herein as being applied to broad-coverage sentence realization in French and German to illustrate how the approach handles word order generalizations in these languages. The techniques are applicable to any other language as well.

Figure 1:
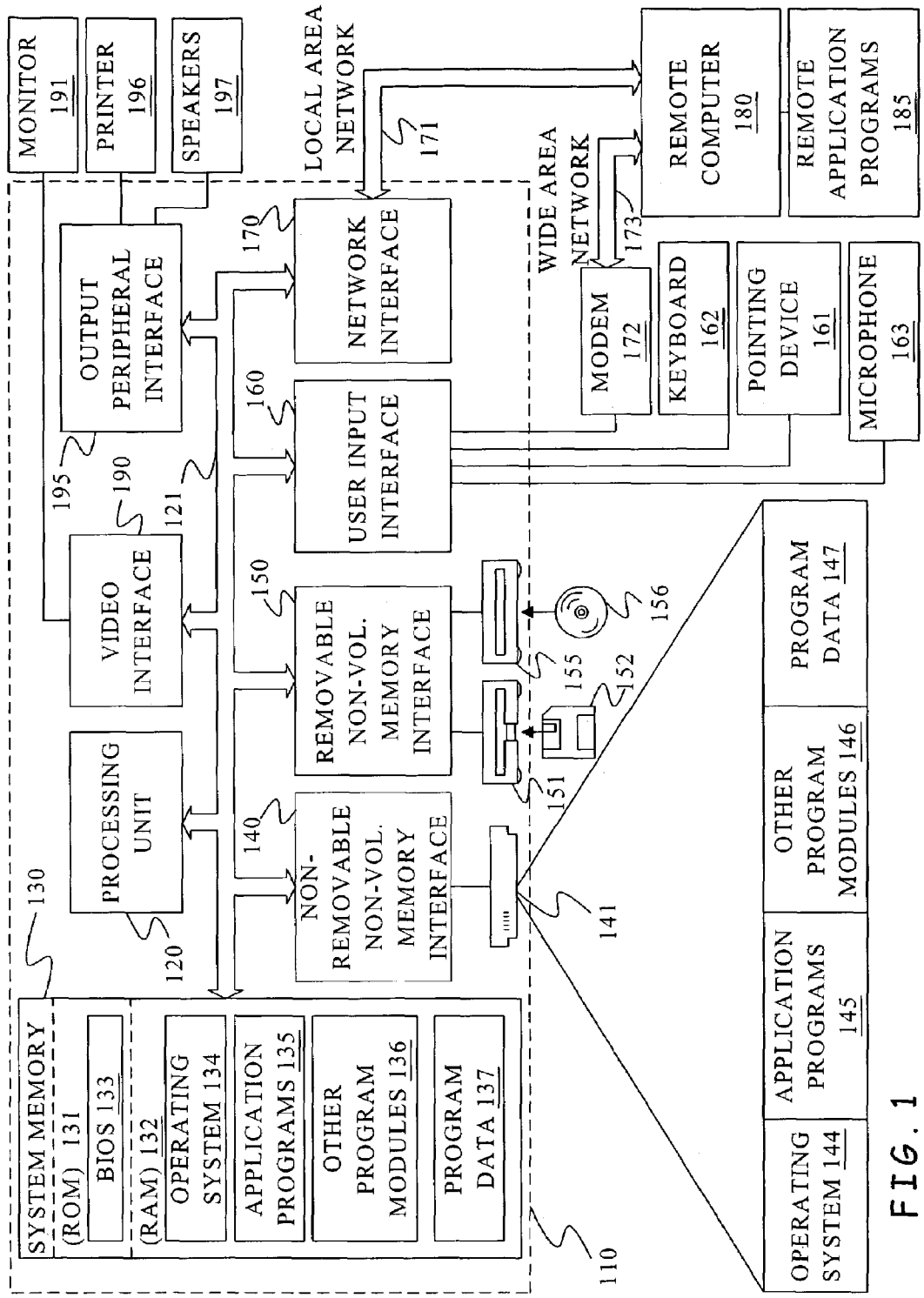
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not-limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
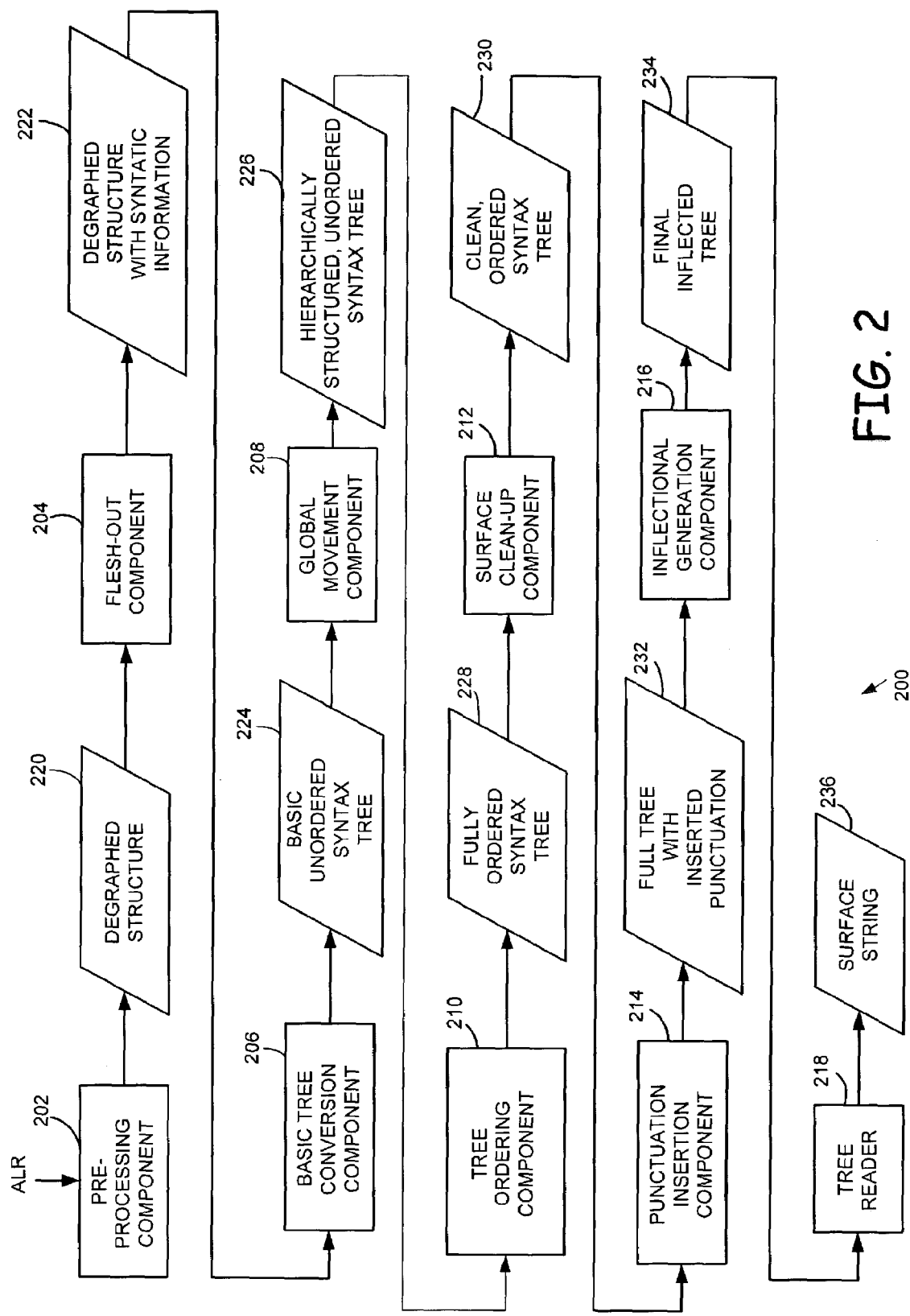
FIG. 2 is a block diagram of one embodiment of a sentence realization system, including a box for ordering, representing the present invention, and illustrating data flow.

FIG. 2 is a block diagram (also illustrating data flow) of sentence realization component 200 in which the present invention is employed. Sentence realization component 200 includes preprocessing component 202, flesh-out component 204, basic tree conversion component 206, global movement component 208, intra-constituent ordering component 210, surface cleanup component 212, punctuation insertion component 214, inflectional generation component 216 and tree reader component 218. The overall operation of system 200 is now described System 200 receives as an input an abstract linguistic representation of an input sentence. In the embodiment discussed herein, the input is a logical form. However, it will be appreciated that substantially any other syntactic or semantic representation of a sentence can be received as an input as well. A logical form structure is set out in greater detail in U.S. Pat. No. 5,966,686 issued Oct. 12, 1999 to Heidorn et al. entitled METHOD AND SYSTEM FOR COMPUTING SEMANTIC LOGICAL FORMS FROM SYNTAX TREES.

Preprocessing component 202 processes the abstract linguistic representation by degraphing the input. For example, where the input is a logical form, it is a graph structure, rather than a tree structure. Thus, the input structure is degraphed and converted into a more tree-like structure. Preprocessing component 202 also adds lexical information to the input structure, such as through a dictionary lookup operation. Preprocessing component 202 can also perform simplification of compounds. The output of preprocessing component 202 is a degraphed structure 220 which has additional information added thereto.

Flesh-out component 204 receives data structure 220 and adds syntactic information to that data structure. Flesh-out component 204 also inserts function words such as determiners, auxiliaries, semantically empty prepositions, relative pronouns, etc. Component 204 also assigns case features and verb-position features, as well as the probabilities for spelling out noun phrases in subject or object positions. Flesh-out component 204 provides, as an output, structure 222 that is a degraphed structure with syntactic and other information added thereto.

Basic tree conversion component 206 receives data structure 222 and converts that data structure into a basic syntax tree. Component 206 reads off a syntactic tree structure from the degraphed data structure 222 and splits separable prefixes from their stems. Component 206 can also introduce a syntactic representation of coordination, and reverse certain syntactic dominance relations. Component 206 provides, as an output, a basic unordered syntax tree 224.

Global movement component 208 receives structure 224 and performs global movement or global ordering. Global movement involves the movement of question words (Wh words), relative pronouns, and a process known in linguistic theory as raising. Component 208 also performs extraposition processing. Component 208 provides, as an output, structure 226 in which each constituent has the correct parent, although the constituents in 226 are unordered.

Intra-constituent ordering component 210 receives structure 226 as an input and fully orders the nodes in the syntax tree to provide a fully ordered syntax tree 228 at its output.

Surface cleanup component 212 receives structure 228 and performs surface cleanup operations, such as surface realization of determiners, relative pronouns and reflexive pronouns. Component 212 also deletes duplicated material in coordination. Component 212 provides, as an output, a clean, fully ordered syntax tree 230.

Punctuation component 214 receives structure 230 and inserts punctuation marks into the syntax tree. Component 214 provides as its output the clean, fully ordered syntax tree, with punctuation inserted as indicated by numeral 232.

Inflectional generation component 216 receives structure 232 and generates final inflection and outputs a final inflected tree 234. Tree reading component 218 simply reads tree 234 and provides, as its output, surface string 236 (or realized sentence 236) by emitting the words at the leaves of final inflected tree 234. This is the end of the pipeline shown in FIG. 2.

Using the above-described system, sentence strings are generated from semantic dependency graphs, using a variety of machine-learned modules which determine the contexts for the application of particular linguistic operations. These operations transform that semantic representation into a syntactic tree and a fluent string.

Once all syntax nodes have been created and all hierarchical relations have been established, order is determined among the constituents of the unordered syntax tree to produce an ordered syntax tree.

Figure 3:
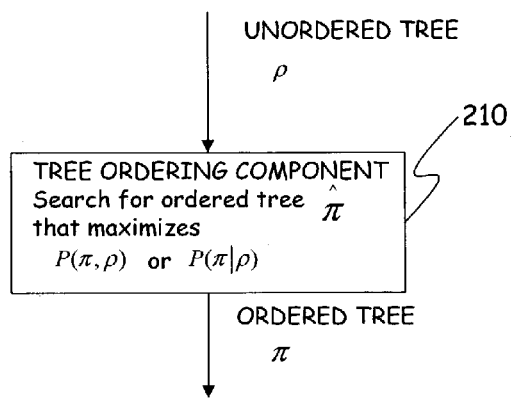
FIG. 3 is a block diagram illustrating an ordering component of the type used in the present invention to identify an ordered syntax tree given a particular unordered syntax tree.
Figure 4:
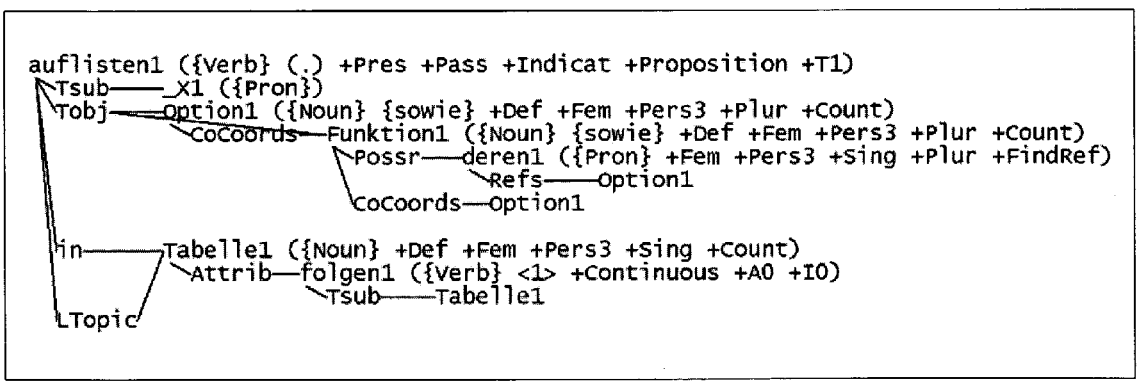
FIG. 4 is an exemplary semantic representation of a sentence used as an input to the present invention, and is embodied as a logical form.
Figure 5:
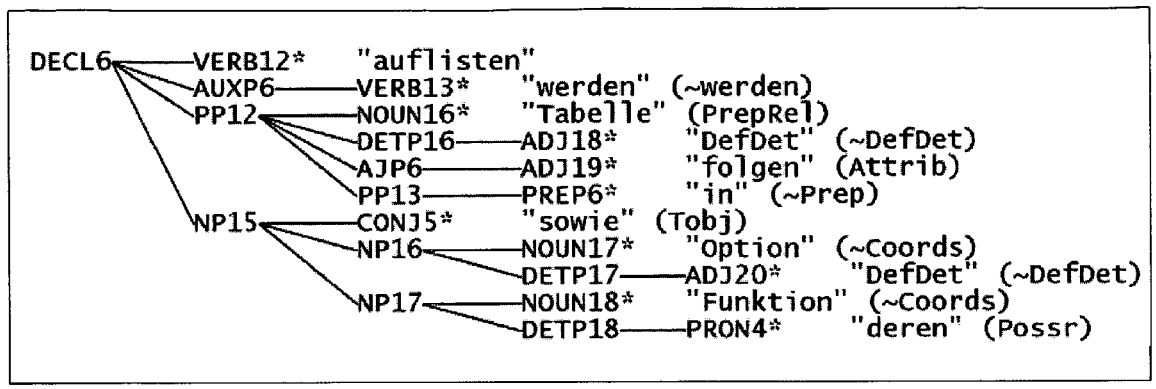
FIG. 5 illustrates an example of an unordered syntax tree, corresponding to the logical form in FIG. 4, and exemplary of the kind of input for the ordering component.
Figure 6:
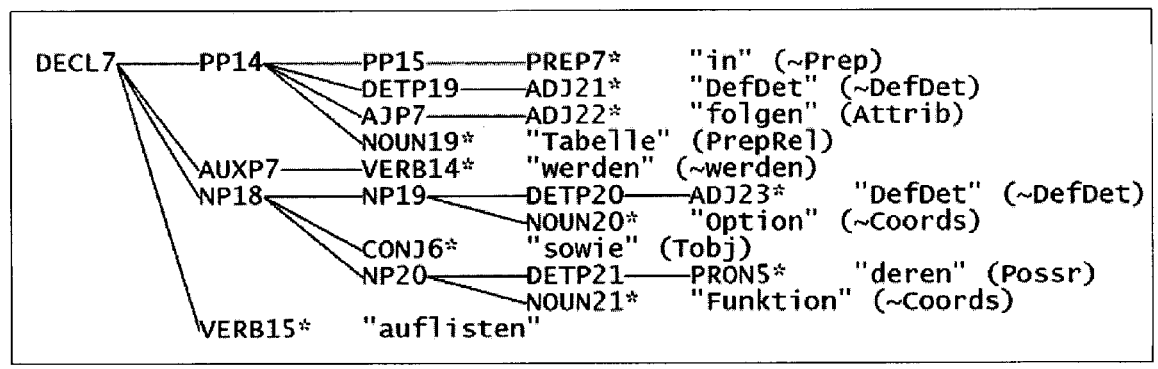
FIG. 6 illustrates an example of an ordered syntax tree, corresponding to the unordered tree in FIG. 5, and exemplary of the output from the tree ordering component.

This is represented generally in FIG. 3 in which an unordered syntax tree is ordered by ordering component 210, resulting in an ordered syntax tree (or a list of ordered trees). The unordered syntax tree can be for example as shown at 226 in FIG. 2, while the ordered syntax tree can be as shown at 228 in FIG. 2. For example, consider the unordered syntax tree for the example shown in FIG. 5. This unordered syntax tree is derived from the semantic dependency graph shown in FIG. 4 for the German sentence: "In der folgenden Tabelle werden die Optionen sowie deren Funktionen aufgelistet." The English equivalent of this sentence is: "The options and their functions are listed in the following table." In FIG. 5, the semantic relations between modifier and head are shown in parentheses at the leaves. An ordered syntax tree for this unordered syntactic tree could be the tree shown in FIG. 6.

The present invention, in one embodiment, further enhances the sentence realization process by utilizing decision trees to estimate the probability distributions in models of constituent structure to establish constituent order. This approach can handle a large feature space without manual feature selection. Other embodiments employ other techniques (such as maximum entropy training of log-linear models) to estimate the probability distributions.

Most previous research into the problem of determining constituent order during sentence realization has focused on English, a language with fairly strict word and constituent order. In this disclosure we focus on French and German which present novel challenges. The goal of invention is to present a model that handles all ordering phenomena in a unified and elegant way across typologically diverse languages. In the present disclosure, we describe the space of possible models and examine some of these closely. Before describing the models in detail, we outline the issues in determining word and constituent order in French and German.

Word and Constituent Order

The challenge for any model of constituent order is to learn preferred ordering constraints, dependent on constituent type and context, in order to generate fluent sentences.

The challenge in German sentence realization is the combination of rigid verb position with fairly free positioning of other constituents. In declarative main clauses and in a small subset of subordinate clauses, the finite verb must appear in second position after any kind of constituent ("verb-second" clauses). Finite verbs in most subordinate clauses and all non-finite verbs are placed at the end of the clause ("verb-final" clauses, as in FIG. 6). Mistakes in the placement of verbs result in texts with low intelligibility.

Arguments of the verb and additional modifiers can be placed in various positions within the template defined by this rigid verbal frame. The structural, pragmatic and semantic constraints that determine the placement of these fluid constituents are not completely understood.

French is similar to English inasmuch as the relationship between surface syntax and grammatical relations is rather direct. French lies between English and German in the complexity of the ordering task. Like English, French has a fairly strict ordering of constituents, but word order is less strict in French than in English. Like English, French is an SVO language, but ordering of complements is fairly free: PP complements often precede object complements larger than a single word, and they can occur at the beginning of the sentence. In relative clauses, inversion of non-clitic subjects is frequent. Adjective position is also less rigid than in English: many adjectives can precede or follow the noun they modify, while other adjectives only precede or follow the noun.

On the other hand, ordering of constituents between the subject and the verb is very strict. Clitic pronouns and the clitic negator, both of which are orthographically represented in French as independent words, occur between the subject and the verb in a strict order determined by the type of clitic (object, dative, or location) and the agreement features of the clitic.

Models of Constituent Order

For the purpose of describing the models of constituent structure that capture important order phenomena, we consider the space of possible joint and conditional models. The independence assumptions in the models, the set of features used in the models, and automatic feature selection all play an important role in producing useful models. Many combinations are possible, and this invention encompasses the combinations we have found to be useful.

Our models differ from the previous statistical approaches in the range of input features. Like the knowledge-engineered approaches, the models presented here incorporate lexical features, part-of-speech, constituent-type, constituent boundaries, long-distance dependencies, and semantic relations between heads and their modifiers.

Although the described models do not cover the entire space of possible models, we have chosen significant points in the space.

Joint Models

We begin by considering joint models of constituent structure of the form $P(\pi,\rho)$ over ordered syntax trees $\pi$ and unordered syntax trees ρ. An ordered tree π contains nonterminal constituents C, each of which is the parent of an ordered sequence of daughters $(D_1, \ldots, D_n)$, one of which is the head constituent H. (All capital Latin letters denote constituents, and corresponding lower-case Latin letters denote their labels—i.e., syntactic categories.) Given an ordered tree π, the value of the function unordered_tree(π) is an unordered tree ρ corresponding to π that contains a constituent B for each C in π, such that B=unordered_set(C)={$D_1, \ldots, D_n$}, again with H=$D_i$ for some i in (1 . . . n). The hierarchical structure of ρ is identical to π.

We employ joint models for scoring alternative ordered trees as follows: given an unordered syntax tree ρ, we want the ordered syntax tree $\hat{\pi}$ that maximizes the joint probability. That is, we seek $$\hat{\pi} = \arg\max_{\pi} P(\pi, \rho) = \arg\max_{\pi:\rho=\text{unordered\_tree}(\pi)} P(\pi) \quad \text{Equation 1}$$

As Equation 1 indicates, we can limit our search to those trees π which are alternative orderings of the given tree ρ.

To constrain the possible model types we are considering, we assume that the ordering of any constituent is independent of the ordering within other constituents in the tree, including its daughters. Hence, each constituent can be ordered independently; consequently, $$P(\pi) = \prod_{C \in \text{consits}(\pi)} P(C) \quad \text{Equation 2}$$

Specifically, for $\hat{\pi}$, we have:

$$P(\hat{\pi}) = \prod_{\hat{C} \in \text{consits}(\hat{\pi})} P(\hat{C}) \quad \text{Equation 3}$$

Finally, for each B∈constits(ρ), $$\hat{C} = \arg\max_{C:B=\text{unordered\_set}(C)} P(C) \quad \text{Equation 4}$$

Thus, we have reduced the problem to finding the best ordering of each constituent of the unordered tree.

In fact, we can constrain our search further according to the head of B, since C's head must match B's:

$$\hat{C} = \arg\max_{\substack{C:B=\text{unordered\_set}(C) \\ \&\text{head}(B)=\text{head}(C)}} P(C) \quad \text{Equation 5}$$

The only possible ordered trees are trees built with constituents that satisfy the above predicate. We need to normalize P(C) so that P(π) reflects this. Let Z be the normalization constant:

$$Z = \sum_{\substack{C:B=\text{unordered\_set}(C) \\ \&\text{head}(B)=\text{head}(C)}} P(C) \quad \text{Then:} \quad \text{Equation 6}$$

$$\hat{C} = \arg\max_{\substack{C:B=\text{unordered\_set}(C) \\ \&\text{head}(B)=\text{head}(C)}} \frac{P(C)}{Z} \quad \text{Equation 7}$$

Of course, for a given B, Z is constant and, therefore, has no impact on the value of the argmax, so we do not need to compute it in practice.

Now if we wish to condition on some feature x=ƒ(ρ), then we must first predict it:

$$\hat{C} = \arg\max_{\substack{C:B=\text{unordered\_set}(C) \\ \&\text{head}(B)=\text{head}(C)}} P(x)P(C|x) \quad \text{Equation 8}$$

If x is truly a feature of ρ and does not depend on which C consistent with ρ we consider, then P(x) is constant, and we do not need to compute it in practice. Hence, even for a joint model P(C), we can add conditioning features that are fixed in the given unordered tree ρ without first predicting them, as in Equation 9.

$$\hat{C} = \arg\max_{\substack{C:B=\text{unordered\_set}(C) \\ \&\text{head}(B)=\text{head}(C)}} P(C|x) \quad \text{Equation 9}$$

The joint models described here are of this form. For this reason, when we describe a distribution P(C|x), unless we explicitly state otherwise, we are actually describing the part of the joint model that is of interest. As justified above, we do not need to compute P(x) and will simply present alternative forms of P(C|x).

We can factor the distribution P(C) (or P(C|x)) in many different ways using the chain rule. We adopt the class of models called Markov grammars as our starting point. A "Markov grammar" is a model of constituent structure that starts at the root of the tree and assigns probability to the expansion of a non-terminal one daughter at a time, rather than as entire productions (See Charniak, E., 1997, "Statistical Techniques for Natural Language Parsing," In *AI Magazine* (1997); and Charniak, E., 2000, "A Maximum-Entropy-Inspired Parser," in *Proceedings of ACL 2000*, pp. 132-139.)

Left-to-Right

Figure 7:
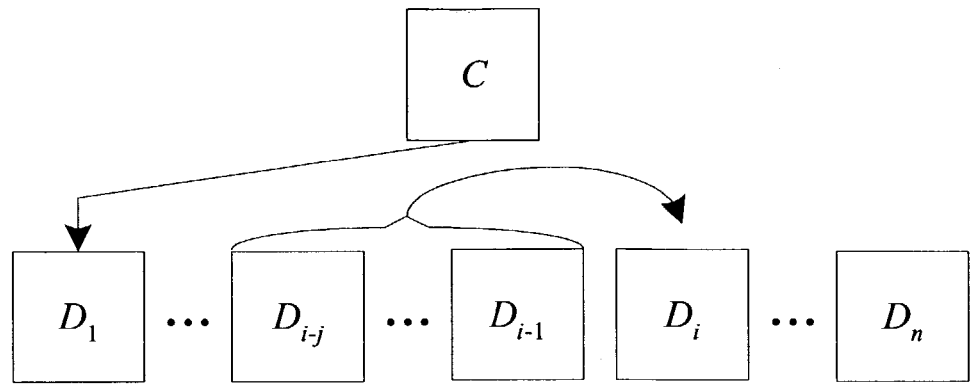
FIG. 7 is a block diagram illustrating a left-to-right expansion of a constituent.

Still focusing on joint models, we first consider a left-to-right Markov grammar of order j that expands C by predicting its daughters $D_1, \ldots, D_n$ from left-to-right, one at a time, as shown in FIG. 7, according to the distribution in Equation 11.

$$P(C|h) = \prod_{i=1}^{n} P(d_i | d_{i-1}, \ldots, d_{i-j}, h, c) \quad \text{Equation 11}$$

In order to condition on another feature of each daughter $D_i$, such as its semantic relation $\psi_i$ to the head constituent H, we also first predict it, according to the chain rule. The result is Equation 12:

$$P(C \mid h) = \prod_{i=1}^{n} \left[ \begin{array}{l} P(\psi_i \mid d_{i-1}, \psi_{i-1}, \ldots, d_{i-j}, \psi_{i-j}, h, c) \times \\ P(d_i \mid \psi_i, d_{i-1}, \psi_{i-1}, \ldots, d_{i-j}, \psi_{i-j}, h, c) \end{array} \right] \quad \text{Equation 12}$$

Thus, the model predicts semantic relation $\psi_i$ and then the label $d_i$ in the context of that semantic relation.

As an extension to the above model, we include features computed by the following functions on the set $\alpha_i$ of daughters of C already ordered:
  Number of daughters already ordered (size of $\alpha_i$)
  Number of daughters in $\alpha_i$ having a particular label for each of the possible constituent labels {NP, AUXP, VP, etc.} (24 for German, 23 for French)

In this way, a model of Markov order j can potentially have true order greater than j. At this point, our use of the terminology "Markov grammar" differs from conventional interpretations of the phrase. We denote that set of features in shorthand as $f(\alpha_i)$:

$$P(C \mid h) = \prod_{i=1}^{n} \left[ \begin{array}{l} P(\psi_i \mid d_{i-1}, \psi_{i-1}, \ldots, d_{i-j}, \psi_{i-j}, h, c, f(\alpha_i)) \times \\ P(d_i \mid \psi_i, d_{i-1}, \psi_{i-1}, \ldots, d_{i-j}, \psi_{i-j}, h, c, f(\alpha_i)) \end{array} \right] \quad \text{Equation 13}$$

Head-driven

Figure 8:
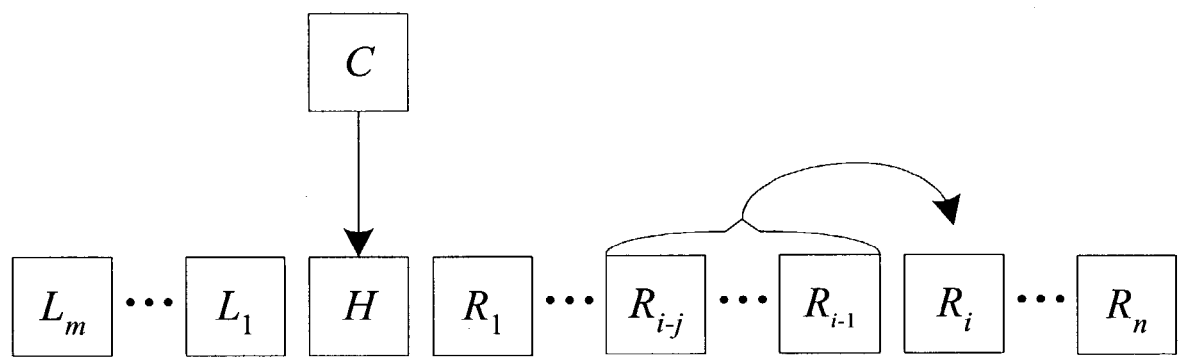
FIG. 8 is a block diagram illustrating a head-driven expansion of a constituent.

As an alternative to the left-to-right expansion, we can characterize each constituent C of an ordered tree $\pi$ as the head daughter H, ordered pre-modifiers $(L_1, \ldots, L_m)$ (of H), and ordered post-modifiers $(R_1, \ldots, R_n)$, as shown in FIG. 8. We call this a "head-driven Markov grammar." If our conditioning context stops at the head, then without loss of generality, our expansion begins first with pre-modifiers followed by post-modifiers. The distribution is two-part, with one part for expansion of the pre-modifiers and a second part for the expansion of the post-modifiers:

$$P(C \mid h) = \prod_{i=1}^{m} P(l_i \mid l_{i-1}, \ldots, l_{i-j}, h, c) \times \prod_{i=1}^{n} P(r_i \mid r_{i-1}, \ldots, r_{i-j}, h, c) \quad \text{Equation 14}$$

As in the left-to-right case, we condition on the semantic relation of a daughter to the head constituent H. For a richer model, we condition on the full set $\alpha_i$ of daughters already ordered (thus conditioning on features across the head).

We now consider more complex models that use additional features: the head H of C, the unordered constituent B that corresponds to C, its parent $P_B$, and its grandparent $G_B$. As context in Equation 13, B, $P_B$, and $G_B$ each represent a set of linguistic features on those respective constituents:

$$P(C \mid \rho) = P(C \mid h, B, P_B, G_B) \quad \text{Equation 15}$$

Consequently our complex model with left-to-right orientation is structured as follows:

$$P(C \mid h, B, P_B, G_B) = \prod_{i=1}^{n} \left[ \begin{array}{l} P(\psi_i \mid d_{i-1}, \psi_{i-1}, \ldots, d_{i-j}, \psi_{i-j}, c, h, B, P_B, G_B) \times \\ P(d_i \mid \psi_i, d_{i-1}, \psi_{i-1}, \ldots, d_{i-j}, \psi_{i-j}, c, h, B, P_B, G_B) \end{array} \right] \quad \text{Equation 16}$$

Here, every model of $P(C|h,B,P_B,G_B)$ can consult arbitrary features of B. We also include features that are functions on the set $\alpha_i$ of daughters of C already ordered.

Finally, we leave the realm of joint models and introduce truly conditional models by including features that are functions on the set $\beta_i$ of daughters of C yet to be ordered. For example:
  Number of daughters remaining to be ordered (size of $\beta_i$)
  Number of daughters in $\beta_i$ having a particular label We denote these feature sets in shorthand as $f(\alpha_i)$ and $f(\beta_i)$:

$$P(C \mid h, B, P_B, G_B) = \prod_{i=1}^{n} \left[ \begin{array}{l} P\left(\psi_i \left| \begin{array}{l} d_{i-1}, \psi_{i-1}, \ldots, d_{i-j}, \psi_{i-j}, \\ c, h, B, P_B, G_B, f(\alpha_i), f(\beta_i) \end{array} \right.\right) \times \\ P\left(D_i \left| \begin{array}{l} \psi_i, d_{i-1}, \psi_{i-1}, \ldots, d_{i-j}, \psi_{i-j}, \\ c, h, B, P_B, G_B, f(\alpha_i), f(\beta_i) \end{array} \right.\right) \end{array} \right] \quad \text{Equation 17}$$

As with the simple models, we also consider complex head-driven Markov grammars of the same form.

Binary Conditional Model

Figure 9:
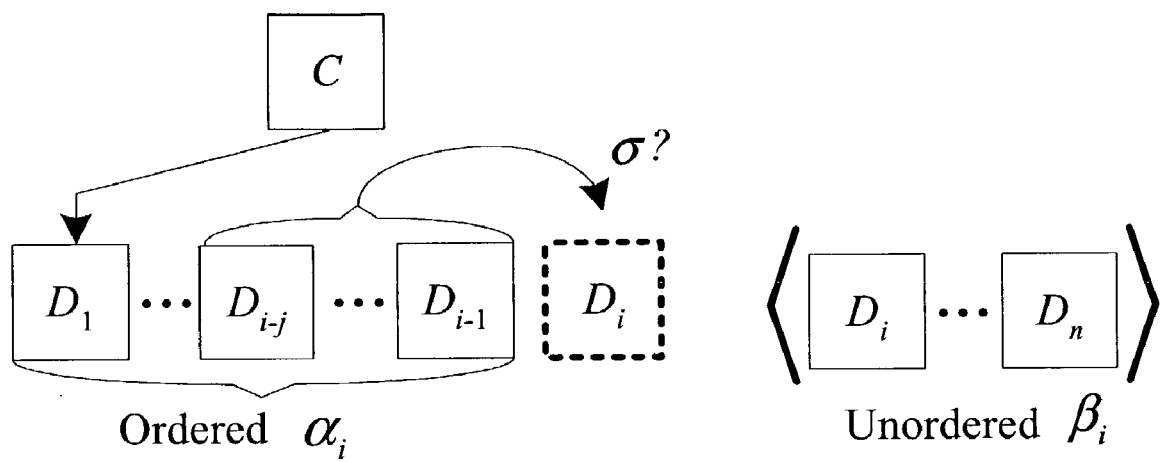
FIG. 9 is a block diagram illustrating a left-to-right expansion of a constituent using a binary-conditional model.

We introduce a third type of model we call the binary conditional model. It estimates a distribution over the binary variable $\sigma$ called "sort-next" with values in {yes, no}. It represents the event that an as-yet unordered member D of $\beta_i$ (the set of as-yet unordered daughters of parent C, as defined above) should be "sorted" next, as illustrated in FIG. 9.

The conditioning features are almost identical to those used in the left-to-right conditional models discussed above, except that D and $\psi$ (the semantic relation of D with head H) appear in the conditional context are never predicted. In its simple form, the model estimates the following distribution:

$$P\left(\sigma \left| \begin{array}{l} d, \psi, d_{i-1}, \psi_{i-1}, \ldots, d_{i-j}, \psi_{i-j}, \\ c, h, B, P_B, G_B, f(\alpha_i), g(\beta_i) \end{array} \right.\right) \quad \text{Equation 18}$$

We describe how to apply this model directly in a left-to-right "sorting" search later in the section on search.

Estimation

We can estimate a model's distributions using a number of different techniques. For this disclosure, we use interpolated language modeling techniques (hereafter abbreviated as LM) and probabilistic decision trees (DTs). Although not described in detail in this disclosure, those of skill in the art will recognize that other approaches to feature selection and distribution estimation can also be used.

We describe models of both types used in our experiments. All models in this disclosure are Markov order 2, with the exception of the additional feature functions $f(\alpha_i)$ and $f(\beta_i)$ defined above.

Language Modeling

Our LM models employ interpolated Kneser-Ney as a smoothing technique. See Kneser R. and Ney H., 1995, "Improved backing-off for m-gram language modeling," in *Proceedings of the IEEE International Conference on Acoustics, Speech, and Signal Processing*, Vol. 1, pp. 181-184; and Goodman J. T., 2001, "A Bit of Progress in Language Modeling: Extended Version," Microsoft technical report MSR-TR-2001-72. One disadvantage to this approach (and the tools we use) is the need for manual feature selection and manually specified back-off order, the practical effect of which is that only a relatively small number of features can be used effectively. We employ a single joint head-driven model of this type in our experiments.

Decision Trees

We build decision trees using the WinMine toolkit (See Chickering D. M., 2002, "The WinMine Toolkit," Microsoft Technical Report 2002-103). It is worth clarifying that WinMine-learned decision trees are not just classifiers; each leaf is a conditional probability distribution over the values of the target feature, given all features available in training; hence the tree itself is an estimate of the same conditional distribution. The primary advantage to using decision trees, and probabilistic DTs in particular, is automatic feature selection from a large pool of features. We employ six models of this type with a rich set of features. Two models are joint; two are joint with features on the set of daughters already ordered (denoted by $f(\alpha_i)$); two are conditional. One of each type is head-driven, and one of each is left-to-right. In addition, we employ one left-to-right binary conditional DT model, both with and without normalization.

Features and Feature Selection

A wide range of linguistic features is extracted for the different decision tree models. The number of selected features for German ranges from 6 to 8 (out of 8) for the joint models, from 7 to 16 (out of 33) for the joint models with $f(\alpha_i)$, from 21 to 107 (out of 487 (head-driven), 494 (l-to-r)) for the conditional models, and reaches 280 (out of 651) in the binary conditional model. For French, the number of selected features ranges from 6 to 8 (out of 8) for the joint models, from 7 to 11 (out of 32) for the joint models with $f(\alpha_i)$, from 22 to 91 (out of 404 (head-driven), 429 (l-to-r)) for the conditional models, and reaches 218 (out of 550) in the binary conditional model, all of which are quite comparable with the German models. The complex and binary conditional models can draw from the full spectrum of available features:

- lexical subcategorization features such as transitivity and compatibility with clausal complements
- lemmas (or word-stems)
- semantic features such as the semantic relation and the presence of quantificational operators
- length of constituent in words
- syntactic information such as the label and the presence of syntactic modifiers From a linguistic point of view it is especially interesting that even with detailed linguistic knowledge of the particulars of German and French grammar it would have been impossible to perform this feature selection manually. A few salient basic semantic features, such as animacy and definiteness are clearly relevant to ordering. However, the interactions of these features are currently too poorly understood to enable a declarative specification of their role in ordering.

Search—Exhaustive Search

Given an unordered tree $\rho$ and a model of constituent structure O, we search for the best ordered tree $\pi$ that maximizes $P_O(\pi|\rho)$, with the context varying according to the complexity of the model. Each of our models (except the binary conditional model) estimates the probability of an ordering of any given constituent C in $\pi$, independently of the ordering inside other constituents in $\pi$. The complete search is a dynamic programming algorithm, either left-to-right in the daughters of C or head-driven, depending on the model. The search maintains one non-statistical constraint: it respects the order of coordinated constituents as they appear in the "unordered" tree.

Search—Greedy Search for Binary Conditional Model

The binary conditional model is applied in a left-to-right "sorting" mode. Consult FIG. 9 for a schematic of the process. For each unordered daughter $D_j$ in $\beta_i$, the model is consulted for the probability of $\sigma_j$=yes, namely that $D_j$ should be placed to the right of the already ordered sister constituents $\alpha_i$. The daughter in $\beta_i$ with the highest probability is removed from $\beta_i$ and extends $\alpha_i$ to the right. The search proceeds with the remaining unordered constituents until all constituents in the list of unordered constituents have been ordered in this greedy fashion.

In order to apply this model in the exhaustive DP search, we normalize the model at every stage of the search and thereby coerce it into a probability distribution over the remaining daughters in $\beta_i$. We represent Equation 18 in short-hand simply as $P(\sigma|d,\psi,\Gamma_i)$, with $\Gamma_i$ representing the contextual features for the given search hypothesis at search stage i. Thus, our normalized distribution for stage i is given by Equation 19. Free variable j represents an index on unordered daughters in $\beta_i$, as does k.

$$P(D_j \mid d_j, \psi, \Gamma_i) = \frac{P(\sigma_j = \text{yes} \mid d_j, \psi_j, \Gamma_i)}{\sum_{k=1}^{\|\beta_i\|} P(\sigma_k = \text{yes} \mid d_k, \psi_k, \Gamma_i)} \qquad \text{Equation 19}$$

Experiments—Training

We describe here a set of experiments to compare and contrast the various models presented above. For training, a training set of 20,000 sentences was used, both for French and German. The data come from technical manuals in the computer domain. For a given sentence in the training set, the sentence was first analyzed as a syntax tree and a semantic dependency graph using the NLPWin system (U.S. Pat. No. 5,966,686 issued Oct. 12, 1999 to Heidorn et al. entitled METHOD AND SYSTEM FOR COMPUTING SEMANTIC LOGICAL FORMS FROM SYNTAX TREES). By consulting the semantic dependency graph and the syntax tree, a tree is produced with all of the characteristics of trees seen by the Amalgam ordering stage at generation run-time with one exception: these training trees are properly ordered. This tree includes all features of interest, including the semantic relations among a head and its modifiers. The order models used are trained from the constituents of these trees.

Experiments—Evaluation

To evaluate the models, the ordering process is evaluated in isolation, independent of the rest of the Amalgam sentence realization process. Test sets of 1,000 sentences are used, also from technical manuals, for each language. To isolate ordering, for a given test sentence, the sentence is processed as in training to produce an ordered tree π (the reference for evaluation) and from it an unordered tree ρ. Given ρ, a search is conducted for the best ordered tree hypothesis $\hat{\pi}$ using the model in question. A comparison of π and $\hat{\pi}$ is then made. Because only constituent ordering is being performed, π and $\hat{\pi}$ can be compared by comparing the order of their corresponding constituents. The metric used to compare two constituents in this case is an edit distance, measured as a percentage of total daughters that participate in moves. The total score for the hypothesis tree $\hat{\pi}$ is the weighted average of the per-constituent edit distance.

Also, average per-constituent edit distance metrics are computed for each non-terminal type for the purpose of error analysis and establishing the impact of a given model on linguistic contexts of interest.

For each model, the average score across the test set for the given language is reported in the table in FIG. 10. For both German and French, the left-to-right binary conditional DT model (applied in a greedy search) outperforms all other models. Normalizing the binary conditional model and applying it in an exhaustive search does not help; in fact the slight drop in accuracy may be due to the label bias problem. See Lafferty et al., 2001, "Conditional Random Fields: Probabilistic models for segmenting and labeling sequence data", in *Proc. Of 18th ICML*, pp. 282-289.

The interpolated language model performs second best for both French and German. This model has the simplest structure but employs the most sophisticated smoothing.

It is interesting to note that the left-to-right joint models (without $f(\alpha_i)$ features) outperform the head-driven joint models for both German and French. Including the $f(\alpha_i)$ features for left-to-right and head-driven reverses the situation for French but not for German.

Again for German, the left-to-right conditional models outperform the head-driven conditional models. For French, it is a close call. As for the question of conditional versus joint models, the simple models (with $f(\alpha_i)$ features) consistently outperform their complex counterparts. This may be due to a lack of sufficient training data. At this time, the training time of the complex models is the limiting factor.

There is a clear disparity between the performance of the German models and the performance of the French models. The best German model is twice as bad as the best French model.

With respect to individual syntactic categories, the strength of the binary conditional model lies primarily in the correct establishment of constituent order within verbal constituents. For German, the binary conditional model scores 9.892% for verbal constituents. The best any of the other models can do is 13.61% (left-to-right joint with $f(\alpha_i)$). For French, the binary conditional model scores 3.602% for verbal constituents. The best any of the other models can do is 5.891% (LM head-driven joint).

The particular difficulty in establishing order in verbal constituents in German is most likely attributable to the challenges of verb-positioning and the more relaxed order of modifiers in the verbal context. To address the verb order issue, an additional feature was included in the unordered tree for experimentation. The position of the verb was annotated on all relevant constituents. By adding this feature to the conditional models, a substantial leap in model accuracy was observed, as shown in the table in FIG. 11.

Again the best model is the binary conditional model. As before, normalization does not help. The improvement contributed by the availability of the verb position feature is a 13% relative reduction in overall ordering error rate. As for the verbal constituents, the score improves to 8.468% with verb position features. The next best model with verb position is the left-to-right conditional model at 12.59%.

Although the present invention has been described with reference to particular embodiments, workers skilled in the art will recognize that changes may be made in form and detail without departing from the spirit and scope of the invention.

What is claimed is:

1. A tree ordering component within a sentence realization system which receives an unordered syntax tree and generates a scored and ranked list of alternative ordered syntax trees from the unordered syntax tree, the tree ordering component comprising:
    a generative statistical model of constituent structure conditioned on features, having a formal structure, and whose parameters are estimated using a statistical estimation technique; and
    a search component which receives the unordered syntax tree for a sentence to be generated, considers the set of possible alternative ordered syntax trees, and identifies which of the alternative ordered syntax trees has a highest probability according to the statistical model of constituent structure, the search component providing as an output a fully ordered syntax tree for use in generating the sentence.

2. The tree ordering component of claim 1, wherein in the statistical model of constituent structure the features have been selected by an automatic feature selection technique.

3. The tree ordering component of claim 1, wherein in the statistical model of constituent structure the parameters of the model are estimated by language modeling techniques.

4. The tree ordering component of claim 1, wherein in the statistical model of constituent structure the parameters of the model are estimated by maximum entropy techniques.

5. The tree ordering component of claim 1, wherein in the statistical model of constituent structure the parameters of the model are estimated by decision tree learning techniques.

6. The tree ordering component of claim 1, wherein in the statistical model of constituent structure the formal structure of the model is a Markov grammar having a particular orientation.

7. The tree ordering component of claim 6, wherein in the statistical model of constituent structure the model having Markov grammar structure is a joint model of constituent structure.

8. The tree ordering component of claim 6, wherein in the statistical model of constituent structure the model having Markov grammar structure is a conditional model of constituent structure.

9. The tree ordering component of claim 8, wherein in the statistical model of constituent structure a feature set of the model includes features of a constituent set defined as follows: for a particular constituent of the unordered tree, during the ordering search, relative to one ordering hypothesis, the daughters of said constituent that remain to be ordered.

10. The tree ordering component of claim 9, wherein in the statistical model of constituent structure the features of the constituent set of interest include a size of that set.

11. The tree ordering component of claim 9, wherein in the statistical model of constituent structure the features of the constituent set of interest include a total number of occurrences of each syntactic category in that set.

12. The tree ordering component of claim 6, wherein in the statistical model of constituent structure the model structure is oriented as a head-driven Markov grammar.

13. The tree ordering component of claim 6, wherein in the statistical model of constituent structure the model structure is oriented as a left-to-right Markov grammar.

14. The tree ordering component of claim 6, wherein in the statistical model of constituent structure the model structure is oriented as a right-to-left Markov grammar.

15. The tree ordering component of claim 1, wherein in the statistical model of constituent structure the formal structure of the model is a binary conditional model.

16. The tree ordering component of claim 15, wherein in the statistical model of constituent structure a feature set of the model includes features of a constituent set defined as follows: for a particular constituent of the unordered tree, during the ordering search, relative to one ordering hypothesis, the daughters of said constituent that remain to be ordered.

17. The tree ordering component of claim 16, wherein in the statistical model of constituent structure the features of the constituent set of interest include a size of that set.

18. The tree ordering component of claim 16, wherein in the statistical model of constituent structure the features of the constituent set of interest include a total number of occurrences of each syntactic category in that set.

19. The tree ordering component of claim 1, wherein in the statistical model of constituent structure a feature set of the model includes one or more lexical features of constituents in the unordered tree.

20. The tree ordering component of claim 1, wherein in the statistical model of constituent structure a feature set of the model includes one or more syntactic features of constituents in the unordered tree.

21. The tree ordering component of claim 1, wherein in the statistical model of constituent structure a feature set of the model includes one or more semantic features of constituents in the unordered tree.

22. The tree ordering component of claim 21, wherein in the statistical model of constituent structure a feature set of the model includes the semantic relation between the head of a given constituent in the unordered tree and the daughters of that constituent.

23. The tree ordering component of claim 1, wherein in the statistical model of constituent structure a feature set of the model includes a length in words of a particular constituent of the unordered tree.

24. The tree ordering component of claim 1, wherein in the statistical model of constituent structure a feature set of the model includes features of a constituent set defined as follows: for a particular constituent of the unordered tree, during the ordering search, relative to one ordering hypothesis, the daughters of said constituent already ordered.

25. The tree ordering component of claim 24, wherein in the statistical model of constituent structure the features of the constituent set of interest include a size of that set.

26. The tree ordering component of claim 24, wherein in the statistical model of constituent structure the features of the constituent set of interest include a total number of occurrences of each syntactic category in that set.

* * * * *